Sept. 12, 1933.  A. M. ALGEO  1,926,024
GLASS FEEDER
Filed May 16, 1932
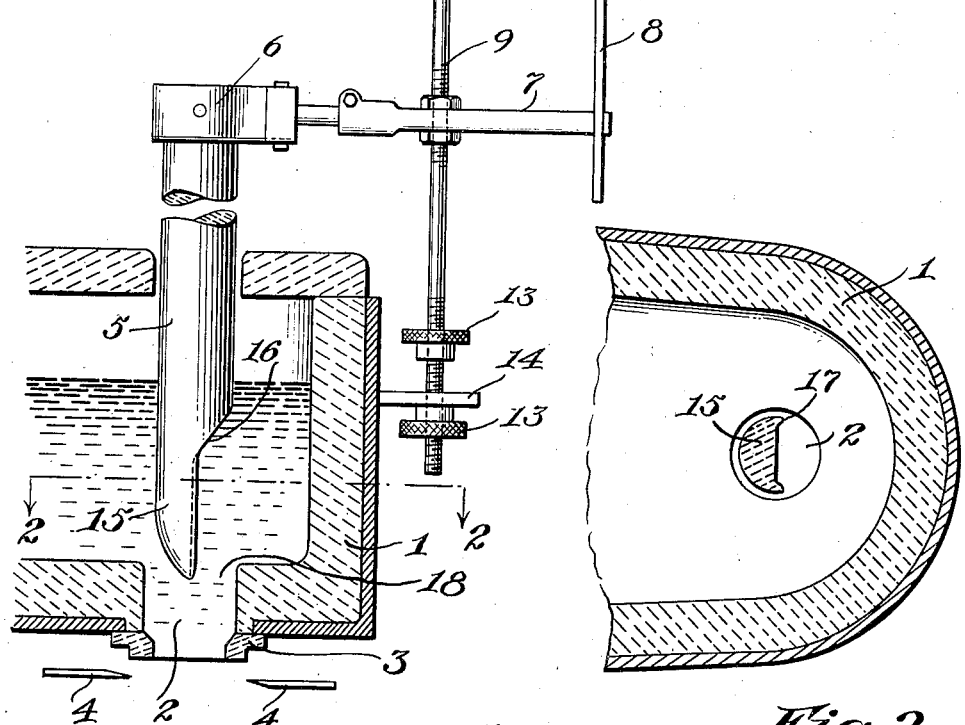
Fig.1.
Fig.2.
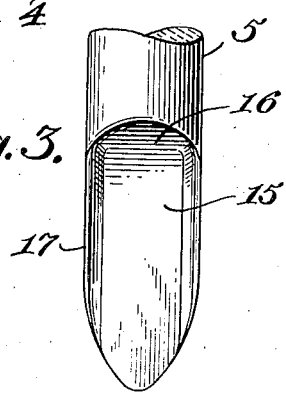
Fig.3.
Inventor
Albert M. Algeo
By
Eccleston & Eccleston
Attorneys Patented Sept. 12, 1933

1,926,024

UNITED STATES PATENT OFFICE

1,926,024

GLASS FEEDER

Albert M. Algeo, Washington, Pa., assignor to Hazel-Atlas Glass Co., Wheeling, W. Va., a corporation of West Virginia Application May 16, 1932. Serial No. 611,676

5 Claims. (Cl. 49—55)

The invention relates particularly to improvements in the old and well known reciprocating plug type of glass feeder, and one of the material objects of the present invention is to provide an extremely simple device for causing the charges of glass to be of uniform temperature and to "hang straight" when delivered through the usual flow orifice.

In the operation of reciprocating plug feeders it is quite common for the glass charge to be colder on the side farther from the furnace, which causes the glass charge to cant toward the cold side as it is delivered, and which also tends to prevent an even distribution of the glass in the subsequent manufacture of the articles.

There are several reasons for the troublesome "cold zone" so common in the operation of glass feeders. For example, the plug is necessarily positioned rather close to the end wall of the flow spout, and this narrow passage tends to restrict the free flow of glass to the outer end of the spout. Also, the glass in this area is farther removed from the heating flame. Then too, there is the shadow effect of the plug itself. The resulting relatively cool glass tends to stagnate and does not flow freely through the orifice, and the path of least resistance for the hotter glass is, therefore, through the near side of orifice.

The present invention eliminates the objectionable features of plug feeders outlined above, as will appear from the following description, when taken in connection with the accompanying drawing; in which, Figure 1 is a vertical longitudinal sectional view through the flow spout; the plug being in elevation and broken away; and the plug operating mechanism being shown more or less diagrammatically.

Figure 2 is a horizontal sectional view through the flow spout and plug, taken on line 2—2 of Figure 1; and Figure 3 is a detail front elevational view of the lower end of the plug.

Referring to the drawing in more detail, numeral 1 indicates a conventional flow spout leading from a glass furnace (not shown). The bottom of the flow spout is provided adjacent its front end with the usual flow orifice 2, below which is arranged the ordinary removable bushing 3. For the purpose of severing the formed charges of gobs of glass, the usual shears are arranged below the flow orifice; the shears being illustrated diagrammatically and referred to by numeral 4.

The reciprocating plug is indicated by numeral 5, and in accordance with the established practice it is arranged in the flow spout in alignment with the flow orifice 2. Any desired and well known mechanism may be employed for reciprocating the plug, and such mechanism per se forms no part of the present invention. Accordingly, it has been deemed sufficient to illustrate the preferred plug reciprocating mechanism for or less generally, rather than in detail. In the mechanism illustrated, the plug is detachably mounted in a collar 6, carried by a cross-arm 7; the rear end of the cross-arm extending through a slot (not shown) in a guide 8. The cross-arm is mounted on an extension 9 of the piston rod 10, which is operated by the piston 11 in cylinder 12. Fluid pressure is alternately admitted to opposite ends of the cylinder to raise and lower the piston rod, and the plug 5 operative thereby; the upper and lower limits of movement of the piston rod and plug being controlled and regulated by nuts 13, 13, threaded in the piston rod extension 9 above and below a fixed projection 14. The operation of the ordinary reciprocating plug feeder, wherein the downward movement thereof accelerates the flow of glass through the flow orifice, and the upward movement thereof retards, stops or retracts the glass, is so well known that a detailed description thereof is unnecessary. Accordingly, the present description will be limited to the novel construction of the plug disclosed herein, and to the novel effect in the feeding of glass produced by such plug.

The lower front portion of the plug is cut away so that only the rear half of the lower portion of the plug remains, as indicated by numeral 15. Above this slender portion 15, the plug broadens out to its full thickness, forming a rather abrupt shoulder 16. In the specific form illustrated the narrow portion of the plug has its face slightly dished out, forming ridges or ribs 17 along the edges of the face.

The plug is reciprocated in the usual and well known manner, but it will be noted that the above-described novel construction of the plug materially changes the effect of the plug on the glass in several respects. In the first place, the cut out portion at the front of the plug provides a larger opening at the front of the spout, as indicated by numeral 18, for the glass to flow through, thus allowing more glass to flow through this side of the flow orifice and hence causing more glass to flow around the plug to the front end of the flow spout, thereby raising the temperature of the glass at that point by preventing the tendency of the glass to stagnate there. In the second place, when the plug moves downwardly, the rather abrupt shoulder 16 tends to force more glass through the front side of the flow orifice than would be the case with the conventional plug, which also increases the flow of glass around the plug to the front end of the spout and thereby further raises the temperature of the glass at that point. From these combined effects, so far as described, the temperature of the glass at the front of the spout is considerably higher than has been the case heretofore in the use of the conventional plug; and the well known "cold zone" is largely eliminated. Nevertheless, the glass at the front side of the plug is not quite as hot as the glass at the rear side thereof, so that there might still be a tendency for the gob to cant toward the cold side. It will be understood, however, that the shoulder 16, in addition to causing more glass to flow through the front side of the flow orifice, by imparting more of an impulse to the glass at that side, counteracts any tendency of the glass to cant toward that side. The combined effect of the improved plug is that the gobs, when delivered, are of substantially uniform temperature and hang straight down.

It will be understood that the invention is not limited to the specific shape of plug illustrated and described herein, as the shape may vary substantially in different installations. For example, the cut-out portion may be greater or less than illustrated, and its vertical extent may be greater or less. Likewise, the shoulder may be more or less abrupt than illustrated, and it can be curved or angular; or, if desired, the cut-out portion could be made by a straight diagonal cut. Some of the various modifications are mentioned to make it clear that the specific shape shown is to be considered as illustrative rather than in a limiting sense.

Having fully described the invention, what I claim is:—

1. A glass feeder including a flow spout having a flow orifice in the bottom thereof, a plug reciprocable in the glass in alignment with the flow orifice, and means for reciprocating the plug, the lower end of said plug having a cut-out portion at its front side only, for the purpose described.

2. A glass feeder including a flow spout having a flow orifice in the bottom thereof, a plug reciprocable in the glass in alignment with the flow orifice, and means for reciprocating the plug, the lower end of said plug having a cut-out portion on its front side only, and a shoulder above the cut-out portion.

3. A glass feeder including a flow spout having a flow orifice in the bottom thereof, a plug reciprocable in the glass in alignment with the flow orifice, and means for reciprocating the plug, the lower end of said plug having a cut-out portion on its front side only, and a curved shoulder above the cut-out portion.

4. A glass feeder including a flow spout having a flow orifice in the bottom thereof, a plug reciprocable in the glass in alignment with the flow orifice, and means for reciprocating the plug, the front half of the lower portion of said plug being cut away, for the purpose described.

5. A glass feeder including a flow spout having a flow orifice in the bottom thereof, a plug reciprocable in the glass in alignment with the flow orifice, and means for reciprocating the plug, the rear half of the lower portion of the plug being rounded, and the front half of the lower portion of the plug being cut away.

ALBERT M. ALGEO.